United States Patent

[11] 3,595,182

| [72] | Inventor | Frank S. Clapp<br>2750 South Platte, Englewood, Colo. 80110 |
|---|---|---|
| [21] | Appl. No. | 865,366 |
| [22] | Filed | Oct. 10, 1969 |
| [45] | Patented | July 27, 1971 |

[54] APPARATUS FOR UNDERGROUND TREATMENT OF POLES
8 Claims, 9 Drawing Figs.

[52] U.S. Cl. .................................................. 111/6, 21/63
[51] Int. Cl. .................................................. B27k 3/10, A01c 23/02
[50] Field of Search .......................................... 21/7, 61—3; 111/6, 7.1—.4; 47/1, 1.7, 37; 37/2; 294/49

[56] References Cited
UNITED STATES PATENTS

| 1,075,459 | 10/1913 | Bowman | 294/49 |
| 2,018,003 | 10/1935 | Axtell | 111/7.1 |
| 2,707,007 | 4/1955 | Shuff | 47/1 X |
| 3,040,680 | 6/1962 | McCluskey | 111/7.4 |
| 3,045,368 | 7/1962 | Whitcomb | 37/2 |
| 3,450,073 | 6/1969 | Baker | 111/6 |

FOREIGN PATENTS

| 851,450 | 10/1960 | Great Britain | 111/7.1 |
| 412,986 | 7/1910 | France | 47/1.7 |
| 708,127 | 7/1931 | France | 111/7.4 |

*Primary Examiner*—Robert E. Bagwill
*Attorney*—Ralph F. Crandell

ABSTRACT: An apparatus for the pressure injection of preservatives to the ground-implanted portion of a pole, includes convex, spadelike, injection probes for surrounding the pole and applying preservatives over a large area of the buried end of the pole. The probes are hollow and have a multiplicity of holes in each convex pole facing surface. The apparatus grips the pole, and the probes are driven into the ground by hydraulic piston and cylinder motors.

PATENTED JUL 27 1971

INVENTOR
FRANK S. CLAPP
BY
Ralph F. Crandell
ATTORNEY

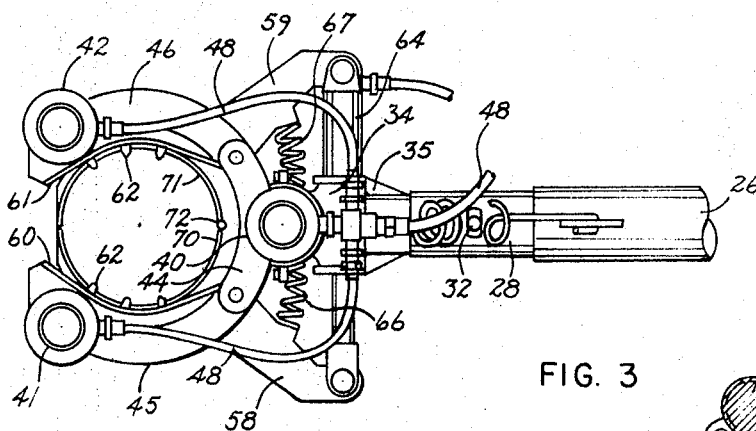
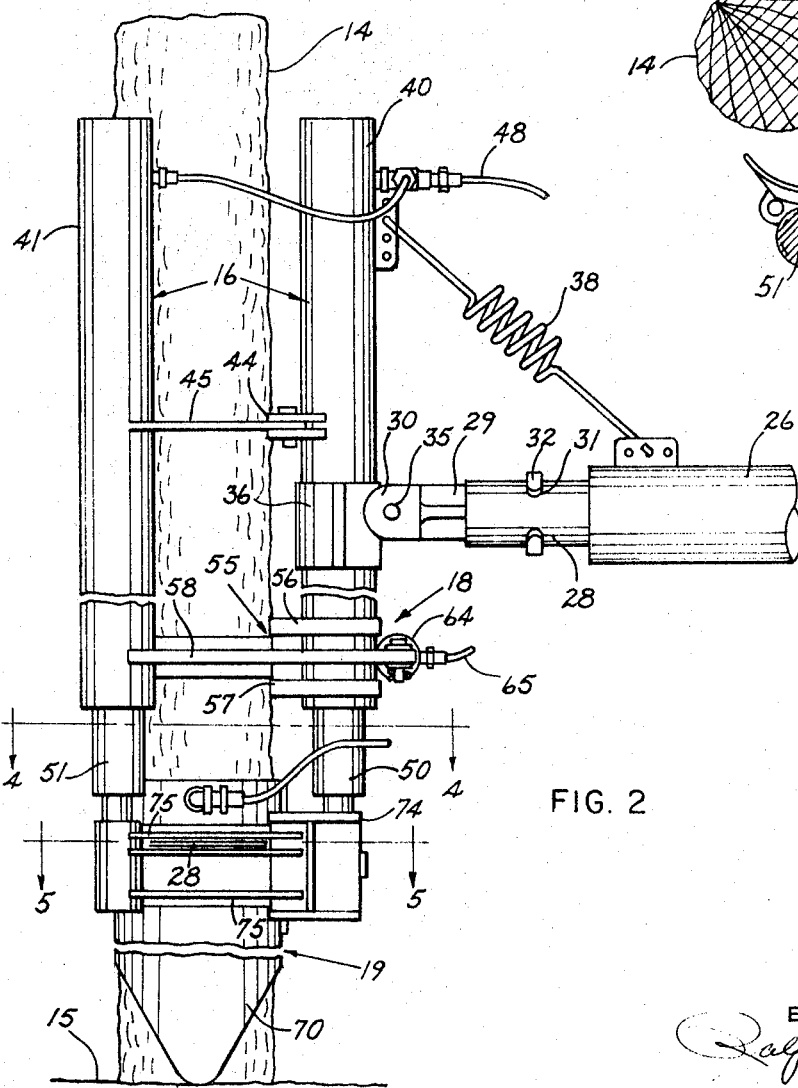
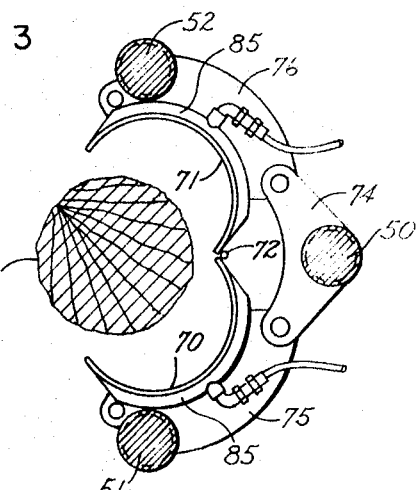
INVENTOR
FRANK S. CLAPP

INVENTOR
FRANK S. CLAPP 3,595,182

APPARATUS FOR UNDERGROUND TREATMENT OF POLES

BACKGROUND OF THE INVENTION

This invention relates to apparatus for the below-ground treatment of ground-implanted poles. More particularly, the invention relates to improvements in apparatus for the pressure injection of preservatives to the buried end portions of poles and posts, and finds particular but not necessarily exclusive utility in the application of preservatives to the below ground-level portions of utility poles.

Preservative injection machines for the pressured application of preservative compounds to erected utility poles at below-ground levels are known in the art, one illustrative machine being shown and described in U.S. Pat. No. 3,450,073, issued June 17, 1969, to Roy E. Baker. The machine shown in that patent utilizes vehicle mounted boom and hoist components for positioning and holding an injector attachment in position against an upright pole as probe elements of the attachment are driven into the ground alongside the pole. Preservative materials are them conducted through the probes to treat the buried portion of the pole.

OBJECTS OF THE INVENTION

The principal object of this invention is to provide an improved apparatus for the below-grade application of preservative material to the ground-implanted portions of poles, posts, and the like. A related object is to provide an improved preservative injection apparatus for the below-grade application of preservatives to the ground-implanted portions of poles wherein the preservative is applied to a substantial circumferential area of the buried portion of the pole.

A further object of the present invention is to provide an improved preservative applying probe construction to facilitate the application of preservatives to the pole.

Another object of the invention is to increase the efficiency and effectiveness of the application of the preservative material by applying the preservative over a large circumferential area of a pole in a single injection step.

A more specific object of the invention is to provide an improved apparatus which securely grips the posts during the preservative treatment operation.

Other objects and advantages will become apparent for the following description and drawings.

DESCRIPTION OF THE DRAWINGS

FIG. 2 is an enlarged elevation view of the apparatus shown in FIG. 1 clamped in operative position on a ground-embedded pole with certain parts foreshortened for convenience in illustration.

FIG. 3 is a plan view of the apparatus shown in FIG. 2.

FIG. 6 is a view similar to FIG. 4 but showing the assembly in an open position for engagement with or disengagement from a pole.

SUMMARY OF THE INVENTION

The invention is embodied in a probe apparatus adapted to be mounted on a boom or like assembly carried by a vehicle. The apparatus includes a plurality of power units mounting a pole gripping assembly. A preservative injection probe assembly is mounted at the lower operative end of the power units. The probe assembly includes a pair of opposed, semicylindrical, spadelike, probe members adapted to surround a pole and be driven into the ground adjacent the ground-implanted end of the pole. A manifold is provided at the upper end of each probe for receiving, under pressure, pole preservative materials. The internal surface of each probe is foraminous so that the preservative materials are forced under pressure into the surface of the ground-embedded portion of the pole.

DESCRIPTION OF THE PREFERRED EMBODIMENT

Figure 1:
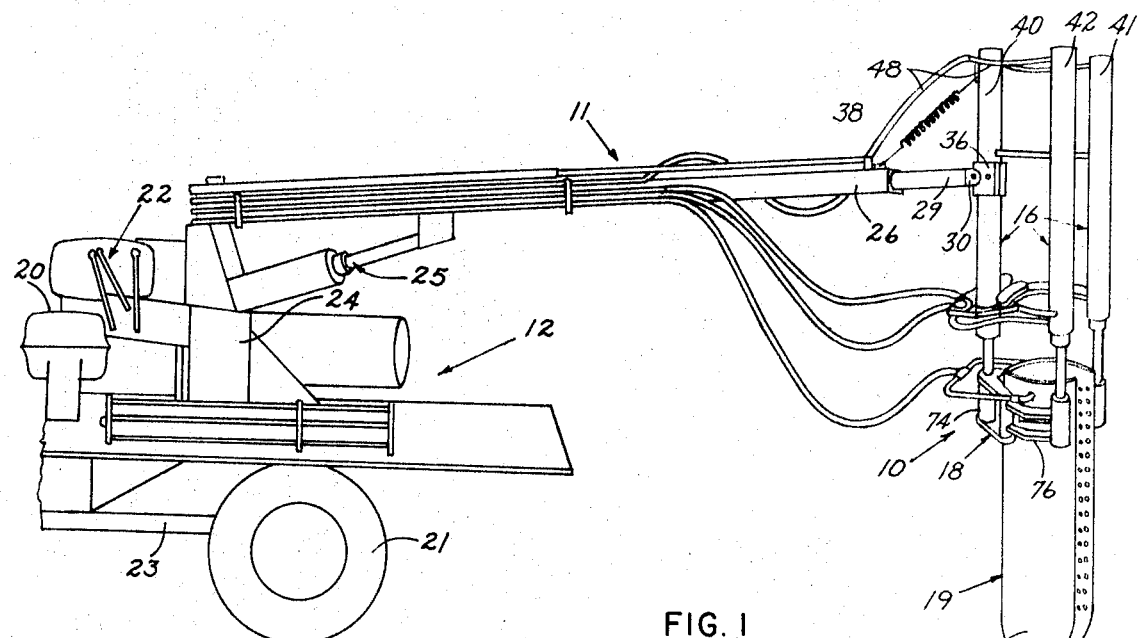
FIG. 1 is a partial side elevation view of an apparatus embodying the present invention boom supported on a wheeled vehicle.

An illustrative probe apparatus embodying the present invention is indicated generally at 10 in FIG. 1 of the drawings. This apparatus is mounted on a boom 11 carried on automotive vehicle 12. The probe apparatus 10 is adapted to be positioned adjacent a ground-implanted pole or the like, indicated at 14 in FIG. 2. The pole 14 conventionally has a ground-implanted end positioned below ground level shown at 15. The probe apparatus 10 is provided to introduce preservatives and like materials to the ground embedded portion of the pole 14 in order to protect and preserve the below ground-level portion of the pole. To this end, the apparatus embodies power units or motors, indicate as generally at 16, and an associated pole gripping assembly 18. The motor units 16 carry at their lower ends, the probe assembly 19. The vehicle 12 carries a tank of liquid preservative material 20.

As shown in FIG. 1, an illustrative vehicle 12 embodies a chassis 20 supported on wheels 21. The vehicle carries a source of pressure fluid and the tank of preservative 20. Appropriate controls 22 are provided for operating the various mechanisms.

The boom 11, as shown in FIG. 1, is mounted on a boom support 24 and is raised and lowered by an appropriate piston and cylinder type hydraulic motor 25. The probe apparatus 10 is mounted on an extensible end 26 of the boom and the boom carries appropriate pressure fluid and preservative supply conduits. For mounting the probe apparatus, the extensible end 26 of the boom is provided with a mounting sleeve 28 (FIG. 2) which in turn supports a trunnion 29 carrying a clevis 30 at its outer end. To provide for limited rotation between the trunnion 29 and sleeve 28, the latter includes a slot 31 adapted to receive a pin 32 fixed to the trunnion 29. A pintle sleeve 34 is mounted in the clevis 30 and is supported therein by a pintle 35. A mounting bracket 36 forms a part of the pintle sleeve 34, and supports the probe apparatus 10. The clevis and pintle construction enables the probe apparatus to be swung in a vertical plane to provide alignment with an in-place pole. A positioning spring 38 is engaged between the boom end 26 and the probe apparatus 10.

Referring to FIG. 2, the probe apparatus 10 there shown is made up of three elements, the power units 16, the pole assembly 18, and the probe assembly 19. The pole gripping assembly 18, when positioned adjacent a pole 14 to be treated, is actuated to grip the pole so that the power units 16 can drive the probe assembly 19 downwardly adjacent the ground-implanted portion of the pole.

The power unit 16 comprises three motors 40, 41 and 42 illustratively shown as piston and cylinder type hydraulically actuated elements. One motor 40 is considered as the main motor and is engaged by the bracket 36 carried on the end of the boom 26. The bracket 36 is tightly clamped around the cylinder of the main motor 40, and serves to support the unit on the boom. The cylinder portion of the main motor 40 is further provided with support elements 44 which pivotally mounts arms 45, 46 affixed to the respective secondary motors 41 and 42. In this manner the secondary motors 41 and 42 are pivotally mounted for inward and outward swinging movement with respect to the main motor 40. The arms 45, 46 are generally arcuate so as to surround the post 14. The motors 40, 41 and 42 are operated by pressure fluid supplied thereto through conduits 48 connected to the source of pressure fluid on the vehicle or supporting unit.

Each of the motors 40, 41 and 42 includes a piston 50, 51 and 52 respectively, which support and drive the probe assembly 19. For gripping the pole during operation of the mechanism, a pole gripping assembly 18 is mounted on the cylinders of the motors 40, 41 and 42. For this purpose, a supporting yoke 55 having upper and lower plates 56, 57 is mounted on the cylinder of the main motor 40. Supported between these plates 56, 57, by means of pin and sleeve constructions, are a pair of generally arcuate supporting arms 58, 59. The arms engage at their outer ends, the cylinders of the secondary motors 41, 42 respectively. For gripping the pole, the arms 58, 59 mount plates 60, 61, each of which carry a plurality of gripping prongs 62 adapted to bite into the surface of the pole being treated and hold the assembly rigidly thereon.

In order to actuate the arms 58, 59 to grip the pole, a clamping motor 64 is mounted between the ends of the arms opposite from the motor engaging ends. This motor is hydraulically actuated and is connected to the source of pressure fluid on the vehicle by means of a conduit 65. The arms 58, 59 are urged into a closed position by springs 66, 67 acting between the main motor cylinder and the arms at a point adjacent the clamping motor 64.

For applying preservative to the ground-implanted portion of the pole, the probe assembly 19 mounted on the depending ends of the pistons 50, 51 and 52 of the motors 40, 41 and 42, includes a pair of opposed, semicylindrical, spadelike probes 70, 71, the lower or driving ends of which are tapered to a bluntly rounded, spadelike point. The cylindrical probes are hinged together by an hinge mechanism 72 at a point adjacent their upper ends.

For mounting the probes 70, 71, on the pistons, a mounting assembly is affixed to the lower ends of the pistons 50, 51 and 52 and comprises a yoke 74 fixed to the lower end of the main piston 50 and pivotally mounting arms 75, 76 respectively affixed to the lower ends of the motor pistons 51, 52. For mounting the semicylindrical probes 70, 71, each probe is provided with a mounting flange 78, 79 respectively which is pivotally engaged, at a point adjacent the outer edge of the probes, with the mounting brackets or arms 75, 76 carried by the pistons.

Figure 7:
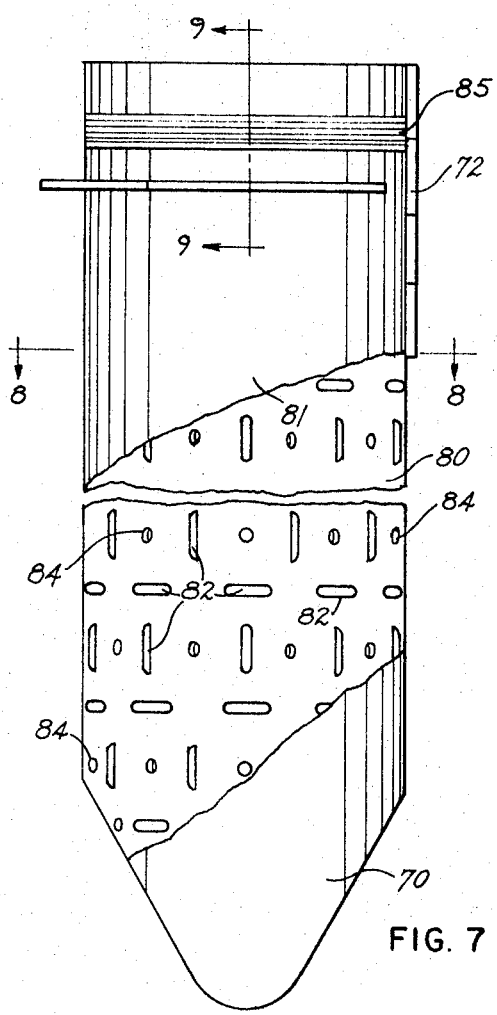
FIG. 7 is an enlarged elevation view of the probe shown in FIG. 2, with a portion of the outer shell of the probe cut away.
Figure 8:
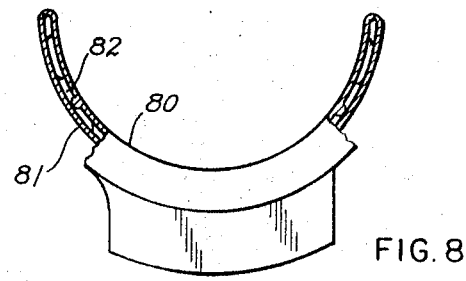
FIG. 8 is a section view taken substantially in the plane of line 8—8 on FIG. 7.
Figure 9:
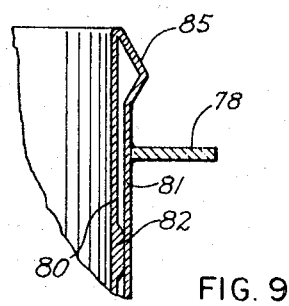
FIG. 9 is a fragmentary section view taken substantially in the plane of line 9—9 on FIG. 7.
Figure 4:
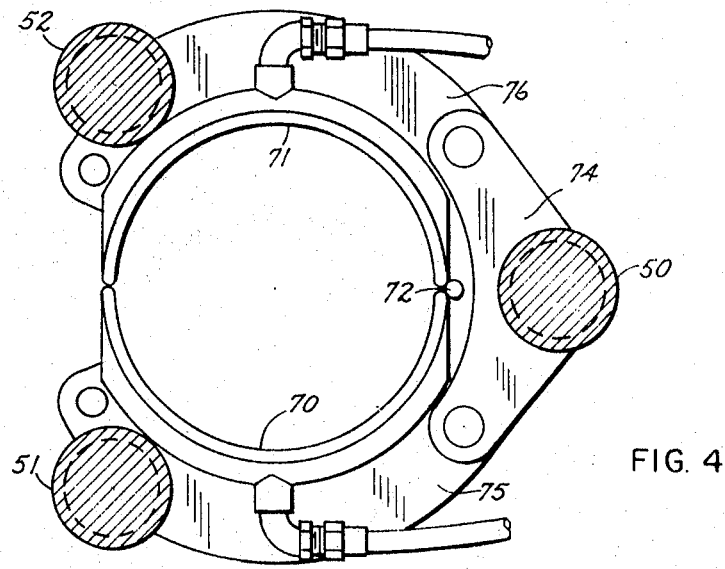
FIG. 4 is a section view taken substantially in the plane of line 4—4 on FIG. 2.
Figure 5:
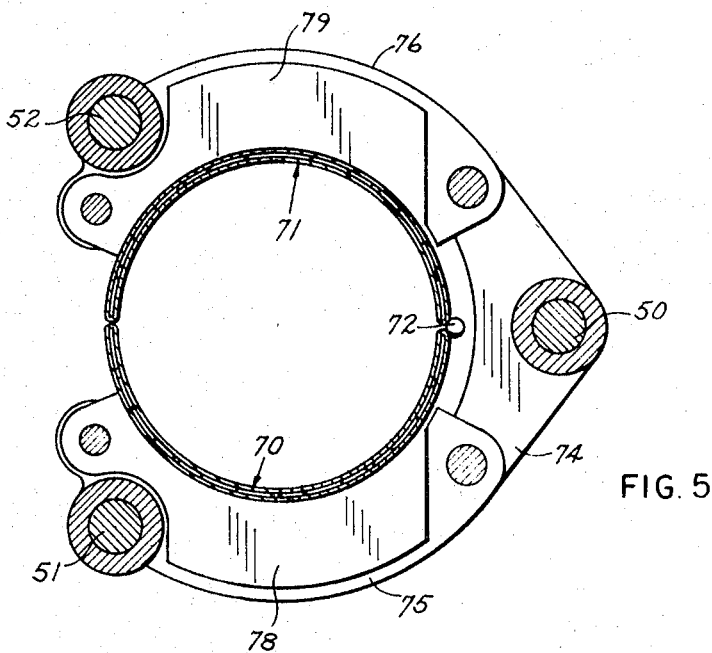
FIG. 5 is a section view taken substantially in the plane of line 5—5 on FIG. 2.

For applying a preservative under pressure to the ground-embedded ends of the pole, the probes 70, 71 are hollow, being formed of an inner convex shell 80, and an outer concave shell 81. The shells 80, 81 are secured together along their corresponding edges and are held in spaced apart relation by beads or weldments 82 applied on their confronting surfaces, as shown in FIG. 7, 8 and 9. The inner convex shell 80 of each probe is provided with a plurality of apertures 84 through which preservative is directed toward an adjacent pole. Liquid preservative material is applied from the preservative tank 20 on the vehicle, through a pump and conduit, to a manifold 85 defined along the upper edge of the outer shell 81. From this manifold, preservative flows under pressure, throughout the hollow space formed between the two shells 80, 81, and outwardly through the apertures 34 into contact with the surface of the pole being treated.

In operation, the probe apparatus 10 is opened to separate the probes as shown in FIG. 6. The apparatus is then positioned adjacent a pole by adjusting the position of the boom 26 and vehicle 12. When the apparatus is adjacent the pole, as shown in FIG. 6, clamping motor 64 is energized to close the probes around the pole and drive the gripping prongs 62 into the pole surface. When the unit has been secured in place on the pole, the motors 40, 41 and 42 are actuated to drive the probes 70, 71 downwardly into the soil adjacent the ground-embedded end of pole. Depending upon the length of the pole, the pole can be treated over a substantial length of its buried end. It will be observed that the probes 70, 71 surround the pole so that the entire surface of the pole is treated over a substantial length. When the probe has been driven into place, preservative material is supplied under pressure to the probes, and flows outwardly with substantial force through the probe apertures, thereby impinging on and impregnating the pole surface. When the desired amount of preservative has been applied, the preservative flow is shut off and the probes withdrawn. The clamping motor 64 is actuated to release the apparatus from gripping engagement with the pole, and the vehicle can be moved to the next pole to be treated.

The apparatus, being flexibly mounted on the end of the boom, readily positions itself with respect to the pole so that as the probes are driven into the ground they follow the inclination of the pole. This assures that the embedded surface area of the pole will be uniformly treated.

The probe apparatus as described above is suitable for attachment to a boom carrying vehicle, a backhoe, a crane, or like vehicle or implement. Because the probe apparatus tightly and securely grips the post during operation, it does not rely on the rigidity or stability of the carrying vehicle. Thus the apparatus can be readily mounted on a pole, actuated to apply a preservative, and then be easily withdrawn. Only one positioning is required as the probes substantially surround the pole being treated.

I claim:

1. In a preservative injection device for the below-grade application of preservative material to the ground-implanted portion of a pole, including a pressurized source of preservative material and a probe driving mechanism adapted for positioning adjacent a pole to be treated, the improvement comprising, a pair of opposed semicylindrical hollow spadelike probes, means mounting said probes on said driving mechanism for releasable surrounding association with a pole, and means for supplying preservative under pressure to said probes, each of said probes having a convex inner pole-facing surface defining a plurality of injection apertures, whereby preservative material can be pressure injected over a substantial surface area of the ground-implanted portion of the pole when said probes are driven into the ground by the probe-driving mechanism in surrounding juxtaposition with the portion of the pole to be treated.

2. A preservative injection device as defined in claim 1, wherein each of said probes comprises spaced inner and outer shells, the inner shell defining said plurality of apertures for directing preservative against the pole surface, and spacing means intermediate said shells for holding said shells in spaced relation as the probe is driven into the ground adjacent the pole.

3. A preservative injection device as defined in claim 2, wherein the outer shell defines at its upper end a manifold for receiving preservative material under pressure from the pressurized source thereof.

4. A preservative injection device for the below-grade pressurized application of liquid preservative material to ground-implanted poles, said device comprising, in combination, clamping means adapted to grip and positively engage the pole at a point above ground level, a plurality of driving motor means mounted on said clamping means, a pair of spadelike probes operatively engaged with and mounted on said driving motor means, said probe means being adapted to substantially surround the pole and extending downwardly for ground penetration adjacent the ground-implanted portion of the pole upon operation of said driving motor means, means for supplying preservative under pressure to said probe means, and said probe means defining a plurality of injection apertures in the pole facing surface thereof whereby preservative can be pressure-injected over a substantial surface are of the ground-implanted portion of the pole.

5. A preservative injection device as defined in claim 4, wherein said clamping means comprises a pair of arcuate arms, a clamping plate secured to each of said arms, a plurality of gripping pins mounted on each said clamping plate for gripping engagement with a pole, and pressure fluid actuated means for actuating said arms to engage and grip the surface of a pole to be treated.

6. A preservative injection device as defined in claim 4, wherein each said probe is formed by spaced substantially semicylindrical bluntly pointed inner and outer shell members joined together along their edges, means interposed between said shell members for holding the shell members in spaced relation as said probes are driven into the ground, and means defining a manifold on the outer shell member adjacent the upper end of each said probe.

7. A preservative injection device as defined in claim 4, wherein said motor means comprises three piston and cylinder motors, with said clamping means being mounted on the cylinder portion of said motors and said probe means being mounted on the piston portion of said motors.

8. A preservative injection device as defined in claim 7, wherein a pair of spaced arms are pivotally mounted at one end on one of said motors, said arms each carrying at its opposite end another one of said motors, means on each of said arms for gripping the surface of a pole to be treated, and power means for moving said arms together to grip the pole.